(No Model.)
2 Sheets—Sheet 1.

E. D. PRIEST.
COUPLING FOR ELECTRIC LOCOMOTIVES.

No. 521,669.  Patented June 19, 1894.

WITNESSES
Henry Westendarp
F. A. Bailey

INVENTOR
Edward D. Priest
by Bradley & Blodgett
Attys.

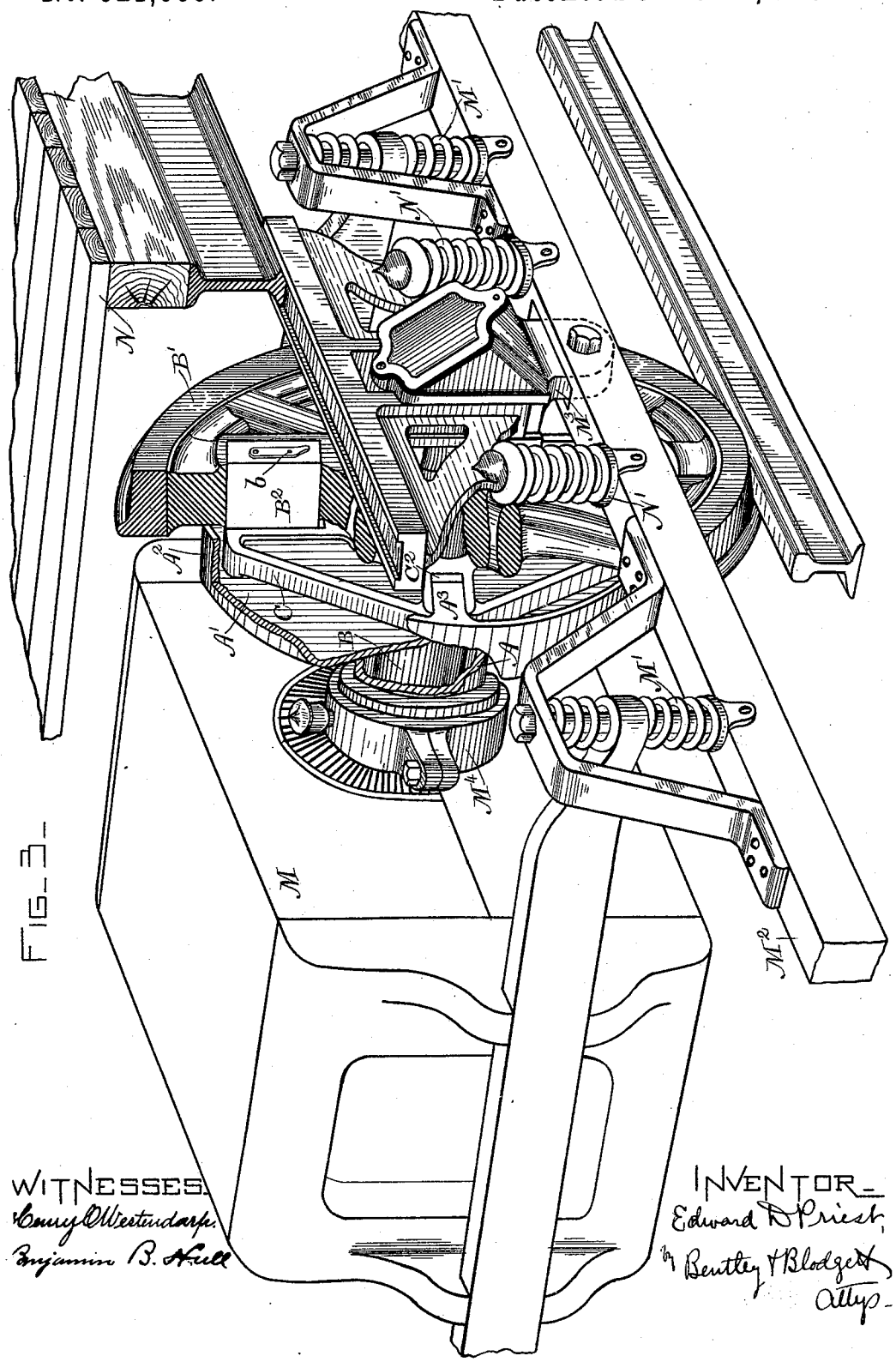

UNITED STATES PATENT OFFICE.

EDWARD D. PRIEST, OF LYNN, ASSIGNOR TO THE GENERAL ELECTRIC COMPANY, OF BOSTON, MASSACHUSETTS.

COUPLING FOR ELECTRIC LOCOMOTIVES.

SPECIFICATION forming part of Letters Patent No. 521,669, dated June 19, 1894.

Application filed June 21, 1893. Serial No. 478,364. (No model.)

*To all whom it may concern:*

Be it known that I, EDWARD D. PRIEST, a citizen of the United States, residing at Lynn, in the county of Essex and State of Massachusetts, have invented certain new and useful Improvements in Couplings for Electric Locomotives, of which the following is a specification.

My invention relates to electric locomotives, its object being to produce a flexible joint or connection between the armature shaft of such a locomotive and the axle driven thereby. In vehicles of that class in which strains of torque are directly transmitted to a wheel or wheels by a motor mounted on an axle carrying the said wheel, such for example as a gearless electric locomotive having the armature of an electric motor directly connected to the axle and rotating the same, it is essential that the motor should be spring-supported with relation to the wheels, not only for the protection of the motor itself from injury attendant upon jarring and vibration due to unevenness of the track, but also for the protection of the track from the hammering and consequent wear caused by the direct weight of the motor thereon.

My invention is designed to attain this end and consists in an improved connection whereby the number of parts which are used in making up the same is lessened, the wheel itself forming one member of a flexible coupling through which the motive power is utilized. By this arrangement, moreover, the flexible connection is brought as near as possible to the point of greatest amplitude of vibration.

Figure 1:
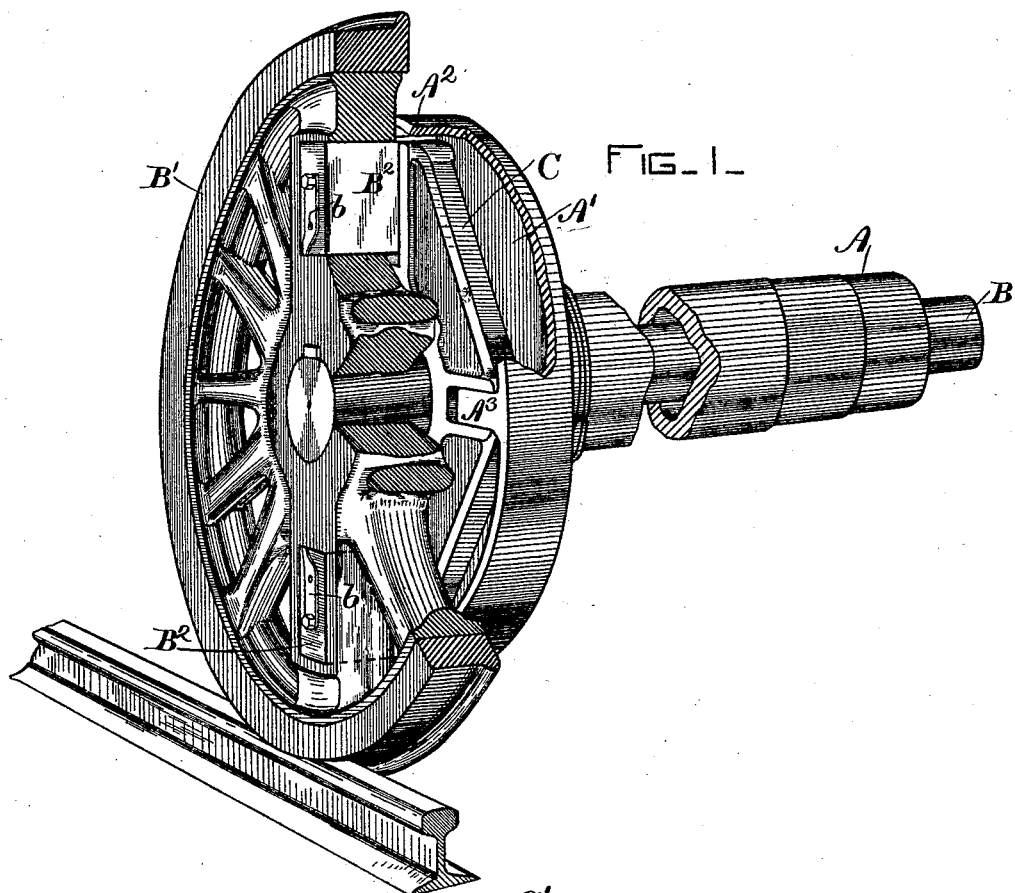
Figure 2:
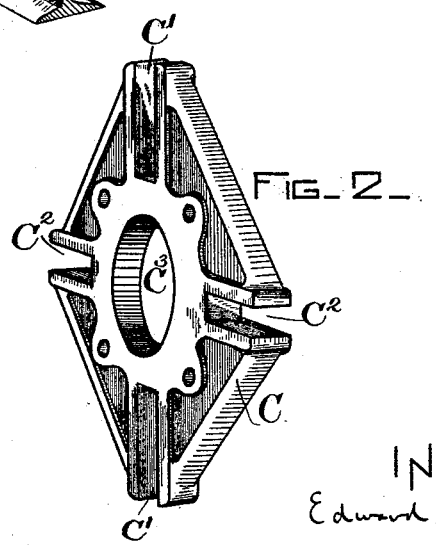

In the accompanying drawings Figure 1 is a perspective view partly in section and partly cut away, showing the aforesaid gearing applied to an electric locomotive. Fig. 2 is a detail showing the float or independent connector forming part of the gearing, and Fig. 3 is a perspective view of a truck and motor in which the improved driving gear herein set forth is employed.

Referring to Fig. 1, the hollow shaft A to which the armature of the motor is keyed, or otherwise directly connected, is provided at its outer end with a disk A' having a flange $A^2$ extending around its circumference. The shaft B comprising the driven member of the coupling extends longitudinally through the said hollow shaft A and is normally concentric therewith, sufficient space, however, being left between the two for independent movement thereof upon suitable supporting springs. Thus, referring to Fig. 3, the motor M is supported by coil springs M' upon side bars or supports $M^2$, which in turn are connected to and supported by the journal boxes $M^3$, which bear upon the axles in the ordinary manner. Upon the same supports $M^2$ is carried the car body N, only the flooring of which is shown, supported upon springs N'. The said journal boxes $M^3$ are carried upon the shaft B, which is the driven member of the coupling, connected to the wheel B' and rigid therewith. The hollow shaft A, on the other hand, which is driven by the armature and constitutes the driving member of the coupling, has a bearing $M^4$ in the frame of the motor M, and is thus rigid therewith but flexibly supported with relation to the shaft B.

In order to connect the driving and driven shafts A and B, an independent float or connector C is provided having slots or recesses C' diametrically opposite to each other, and other slots $C^2$ also diametrically opposite to each other and ninety degrees from said slots C'. Upon the inner side of the flange $A^2$ are lugs or projections $A^3$ diametrically opposite to each other and adapted to fit said slots $C^2$ in the float, the said float resting against the disk A'. Upon the wheel B' are corresponding lugs or projections $B^2$ extending inwardly from the surface of said wheel and adapted to fit the slots or recesses C' in the float C. The said float or connector is provided with a circular opening in its center $C^3$ through which the driven shaft B extends. The lugs $B^2$ are preferably blocks driven into or otherwise fastened in openings made to receive them in spokes of the wheel, said spokes being enlarged and strengthened, if necessary, to resist the strains of torque transmitted thereto by the driving member A through the float C. The slots C' and the slots $C^2$ are somewhat deeper than the length of the lugs $A^3$ and the lugs $B^2$, respectively, which are engaged thereby.

When the above described parts are assembled as shown in Fig. 1, it will be seen that a rotary motion of the hollow or driving shaft A transmits a corresponding rotary motion through the lugs or projections $A^3$ to the float C which in turn carries with it the projections $B^2$ and the wheel $B'$. If, however, in the position shown in the drawings, the wheel $B'$ be lifted, as by an unevenness in the rails, the lugs $B^2$ are free to slide in the recesses $C'$ without correspondingly lifting the driving shaft A. Assuming the wheel to have moved through a quarter revolution so that the spoke containing the lugs $B^2$ is in a horizontal instead of a vertical position and the lugs $A^3$ on the contrary are in a vertical instead of a horizontal position, the wheel may still be lifted over the obstruction, in this case, however, instead of sliding with relation to the float, carrying the float with it, while the said float in turn slides upon the projections $A^3$. In any intermediate position of the wheel the eccentricity of the driving and driven axles is taken up by a combination of the movements above described. In this manner the rotation of the driving member A sets up a corresponding rotation of the driven member B, but at the same time eccentricity of the parts within certain limits is permitted and any vibrations of the wheel are taken up by springs independently of the driving shaft and the motor thereon whereby the said motor is relieved from the sudden jars and hammer-like blows of the wheel in passing over joints, frogs, switches, &c., and the track correspondingly saved from the wear and tear thereof.

Suitable oil holes, as $b$, may be provided leading through the lugs on the respective members of the gearing whereby the movable parts thereof may be kept lubricated, thus insuring ease and freedom in the independent movement of the said members.

What I claim as new, and desire to secure by Letters Patent, is—

1. The herein described coupling for electric locomotives comprising a driving member normally concentric with an axle of the locomotive, a driven member consisting of a wheel keyed to said axle, and a float or independent connector mutually engaged by said members, whereby they are held in driving relation but are permitted to move out of their normal concentric positions, as set forth.

2. The herein described coupling for an electric locomotive comprising a hollow driving shaft normally concentric with an axle of the locomotive and having a disk at its outer end, in combination with the said axle passing longitudinally through said driving shaft, a wheel carried by said axle, and a float or connector mutually engaged by said wheel and said disk whereby the said shaft and axle are flexibly held in driving relation, as set forth.

3. The herein described coupling for an electric locomotive comprising a driving member surrounding an axle of the locomotive and having a disk, flange and projections on said flange, as described, a driven member comprising a wheel carried by said axle and projections on said wheel, and a float or connector engaging the said projections respectively, whereby a movement of one member is imparted to the other member, substantially as described.

In witness whereof I have hereunto set my hand this 19th day of June, 1893.

EDWARD D. PRIEST.

Witnesses:
JOHN W. GIBBONEY,
BENJAMIN B. HULL.